A. B. BROWN & W. A. HICKMAN.
INTERNAL COMBUSTION ENGINE.
APPLICATION FILED FEB. 3, 1910.

986,353.

Patented Mar. 7, 1911.

Witnesses.
H. Davis
P. Shee.

Inventors.
A. B. Brown
and
W. A. Hickman
By
Atty.

THE NORRIS PETERS CO., WASHINGTON, D. C.

UNITED STATES PATENT OFFICE.

ANDREW BETTS BROWN AND WILLIAM ALBERT HICKMAN, OF LONDON, ENGLAND; SAID BROWN ASSIGNOR TO SAID HICKMAN.

INTERNAL-COMBUSTION ENGINE.

986,353.     Specification of Letters Patent.     Patented Mar. 7, 1911.

Application filed February 3, 1910. Serial No. 541,819.

*To all whom it may concern:*

Be it known that we, ANDREW BETTS BROWN and WILLIAM ALBERT HICKMAN, both residents of 3 Bloomsbury street, in the city of London, England, and both subjects of the King of Great Britain, have invented certain new and useful Improvements in Internal-Combustion Engines; and we do hereby declare that the following is a full, clear, and exact description of the same.

The invention relates to improvements in internal combustion engines, as described in the present specification and illustrated in the accompanying drawings that form part of the same.

The invention consists essentially of the novel arrangement and construction whereby the operation of the piston in successive impulses is assured by having an explosion chamber at each end of the cylinder fed from low compression chambers.

The objects of the invention are to thoroughly cool the parts during operation, to increase the efficiency of the gas engine, to devise a simple arrangement of parts which shall insure economy in construction and reduction in weight in proportion to the effectiveness in operation and generally to provide a suitable engine for speed purposes in motor car, aerial, marine and other work.

Figure 1:
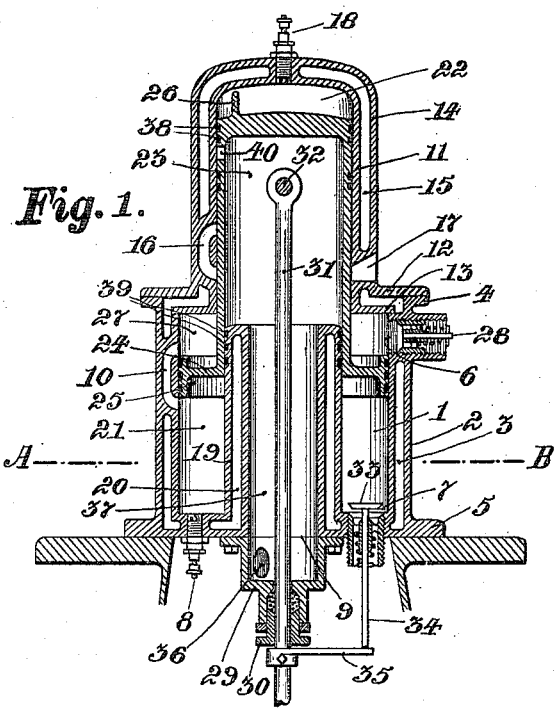
Figure 3:
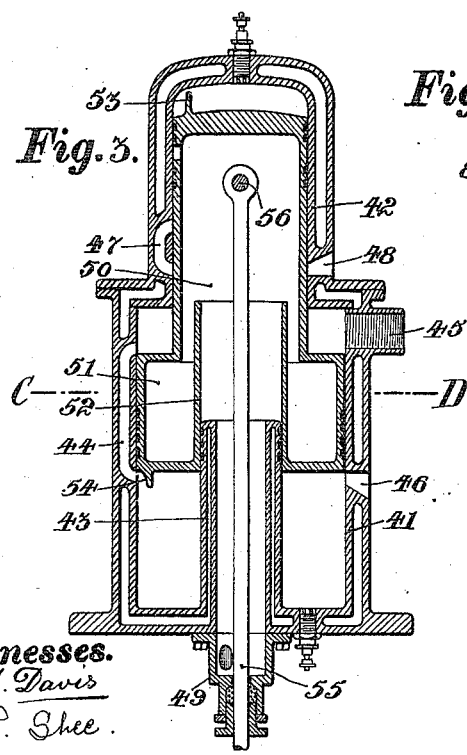
Figure 2:
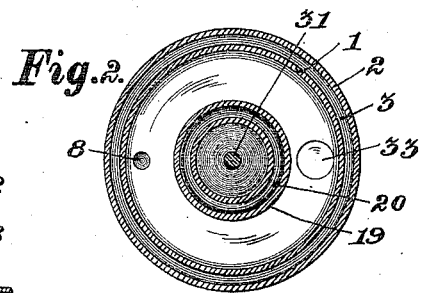
Figure 4:
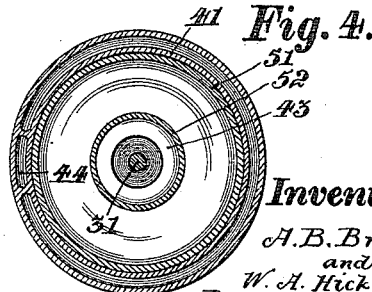

In the drawings, Figure 1 is a vertical sectional view of the preferred form of the engine. Fig. 2 is a cross sectional view on the line A—B in Fig. 1. Fig. 3 is a vertical sectional view of a slightly modified form of the engine. Fig. 4 is a cross sectional view on the line C—D in Fig. 3.

Like numerals of reference indicate corresponding parts in each figure.

The present invention has been made with a view of increasing the efficiency of the two cycle type of internal combustion engine and in the description hereinafter it will be seen by adapting broadly some of the features of the usual two cycle type to a double acting engine of the novel features as set forth herein, a double acting two cycle type is secured which is in reality equivalent to a one cycle internal combustion engine, that is to say, the low compression chambers are so arranged as to feed the explosion chambers of a cylinder respectively, so that a constant succession of impulses follows.

Referring to the drawings, 1 is the larger section of the cylinder encircled by the casing 2 forming the water jacket 3, said section 1 having the flanges 4 at the upper end and the flanges 5 at the lower end, the port 6 through the side wall and the water jacket adjacent to the upper end, the port 7 through the bottom thereof, the sparking plug 8 and the central opening through the bottom 9.

10 is a by-pass formed in the wall of the cylinder section 1 toward the upper end thereof.

11 is the smaller section of the cylinder having the flanges 12 and 13 meeting the larger section and suitably secured thereto and completely surrounded by the casing 14 forming the water jacket 15.

16 is a by-pass in the wall of the smaller section 11 toward the lower end thereof.

17 is an exhaust port toward the lower end of the section 11.

18 is a sparking plug extending through the head of the smaller section 11.

It will be thus seen that the cylinder is formed of two sections 1 and 11, the section 1 being of greater diameter than the section 11, consequently there is a shoulder formed by the flange 13 surrounding the entrance to the smaller section.

19 is a tubular double wall extending in from a central opening 9 and terminating at a point adjacent to the extremity of the said larger section 1 and closed at its top end forming the water jacket 20, and therefore an annular explosion chamber 21 is formed which substantially corresponds in area to the explosion chamber 22 at the other end of the cylinder on account of the larger diameter of the section 1.

23 is the piston of corresponding diameter to the interior of the smaller section 11 and traveling therein and also sliding over, in telescopic arrangement, the tubular wall 19, and having at the lower end the laterally extending flange 24, said flange 24 terminating in the T-head 25, abutting the side wall of the larger section 1.

26 is a baffle plate extending upwardly from the head of the piston toward the inlet side of the explosion chamber 22. The flange 24 forms on the explosion chamber side thereof, a piston face substantially corresponding in area to the face of the piston head at the other end of the piston and the said flange 24 and the flange 13 with the piston and side walls of the larger section 1 form a low compression chamber 27 into which the inlet port leads. The by-pass 10 forms a passage in one position of the piston from the said low compression chamber 27 to the explosion chamber 21.

28 is a spring-held valve of any suitable form arranged in the inlet port 6.

29 is a cap securely bolted to the bottom of the larger section 1 over the central opening 9, said cap terminating in the gland 30, through which the piston rod 31 extends, said piston rod being secured to said piston by the pin 32.

33 is a spring-held valve arranged in the exhaust port 7 and having its stem 34 extend downwardly therefrom.

35 is a rod extending laterally from the piston rod 31 and adapted to engage the stem of the valve 33 for opening the exhaust port 7 from the explosion chamber 21. The cap 29 has the inlet port 36, through which the gas enters into the low compression chamber 37, which is the interior of the piston and the passage formed by the tubular wall 19.

38 are packing rings between the outer side of the wall of the piston 23 and the interior wall of the smaller section 11 of the cylinder.

39 are packing rings between the interior wall of the piston 23 and the tubular wall 19.

40 is an outlet port from the low compression chamber 37 through the wall of the piston 23.

In Fig. 3, 41 is the larger section of the cylinder and 42 the smaller section arranged in practically the same way as the larger and smaller sections 1 and 11.

43 is the tubular wall extending inwardly from the central opening in the bottom of the larger section 41.

44 is the by-pass in the wall of the larger section 41.

45 is the inlet port through the wall of the larger section 41 adjacent to the end thereof.

46 is the exhaust port through the wall of the larger section 41 intermediate of the length thereof.

47 is the by-pass in the wall of the smaller section 42.

48 is the exhaust port through the wall of said smaller section. The general arrangement of the two sections of the cylinder is the same as that illustrated in Fig. 1, such as the water jackets, sparking plugs, and flanges, though the larger section is a little longer.

49 is the cap closing the central opening in the bottom of the larger section 41 and of similar construction to the cap 29.

50 is the piston of hollow type and having the enlarged end 51 traveling in the larger section 41, while the main portion is adapted to travel in the small section 42.

52 is a tubular wall extending upwardly from a central opening in the head of the enlarged end and terminating intermediate of the length of said piston forming an annular chamber in said piston surrounding the tubular wall 43 and telescopically arranged thereon.

53 is a baffle plate extending from the head of the smaller end of the piston adjacent to one side thereof.

54 is a baffle plate extending from the larger end of the piston toward one side thereof.

55 is a piston rod secured to the piston by the pin 56 and extending through the cap 49.

The description of the construction shown in Figs. 3 and 4 has been very much abbreviated in view of the fact that there is comparatively little change from the construction shown in Figs. 1 and 2 being merely a matter of detail to enlarge the lower end of the piston and form an annular chamber therein and not at all essential, though it may be preferable construction under some conditions.

In the operation of this engine, the travel of the piston causes the necessary vacuums in the low compression chambers 27 and 37, with the consequence that the gas is drawn in and as the said gas is very cold the parts of the engine are thoroughly cooled, the first compression, taking the chamber 27, is done by the upward movement of the piston and as the said piston travels along the wall of the larger section of the cylinder, it uncovers the inlet and outlet in the by-pass in the wall of said larger section. This by-pass leads, as explained hereinbefore, from the low compression chamber 27 to the explosion chamber 21, so that the gas flows from said low compression chamber 27 into said annular explosion chamber and on the down stroke, this gas is further compressed and is exploded in the usual manner. On this down stroke, the gas, which has been sucked into the low compression chamber 37, gets its first compression and as the piston continues to travel toward the head of the annular explosion chamber 21, the port 40, that is to say, the outlet port from the low compression chamber 37, registers with the by-pass 16 and as the outlet from said by-pass is free, the gas from said low compression chamber 37 flows in to the explosion chamber 22, therefore on the impulse stroke from the explosion chamber 21, the gas in the explosion chamber 22 is compressed and exploded in the usual manner, which imparts the impulse to the piston in the other direction. In the meantime, the low compression of the second charge has been going on in the chamber 27 and flows in at the proper time into the annular explosion chamber 21, the exhaust port 17 being opened by the travel of the piston rod 31. The exploded gases are thus driven out by the incoming gases and explosion occurs, which drives the piston in the other direction. This operation is constant while the engine is in motion, therefore, there is no lost stroke, each stroke is an impulse stroke combined with the compression stroke and while the separate ends of the cylinder are each in itself a two cycle type of engine, the combined operation, that is the double acting engine makes the whole machine, in operation, a one cycle engine.

The operation of the invention illustrated in Figs. 3 and 4 is precisely similar with the exception that the exhaust valve in the annular explosion chamber is not shown there being merely an exhaust port.

No special feature has been made of the valves in this invention as all such parts are details and not salient features. Any suitable construction may be used so long as the main features to the invention are not departed from, namely, the low compression chambers, an explosion chamber at each end of the cylinder respectively for the purpose of imparting to the piston impulse strokes in constant succession.

What we claim as our invention is:

1. In an internal combustion engine, a cylinder having a reduced section forming an explosion chamber and a tubular wall extending into and forming in the larger section an annular explosion chamber and inlets and outlets, said sections at the joining forming a shoulder, and a hollow piston adapted to enter said reduced section and having an extension to the wall of the larger section forming with said shoulder a low compression chamber suitably connected to an explosive mixture supply and to the annular explosion chamber, said hollow piston also forming in the interior thereof with the passage formed by said tubular wall, a low compression chamber suitably connected to the explosive mixture supply and to the explosive chamber in the reduced end of the cylinder.

2. In an internal combustion engine, a cylinder having a reduced portion and a tubular wall extending inwardly from a central opening in the head of the larger portion forming an explosion chamber in the reduced portion and an annular explosion chamber in said larger portion and suitable inlets and exhausts to and from said explosion chambers, a piston extending into said reduced portion and telescopically arranged over said tubular wall and having lateral extensions from the lower end thereof abutting the side walls of the larger portion of the cylinder, said piston forming, with the passage formed by said tubular wall, a low compression chamber having a suitable inlet and with the walls of said cylinder forming a second low compression chamber having a suitable inlet thereinto, said low compression chambers being connected to the explosion chambers at the end of the cylinder by suitable by-passes, and a cap closing said central opening in the head of the cylinder.

3. In an internal combustion engine, a cylinder formed of sections of different diameters, said cylinder having a central opening through the head of the larger section and a tubular wall extending inwardly from said opening forming an annular explosion chamber of substantially equal area to the explosion chamber in the smaller portion of the cylinder, said explosion chambers having inlets and exhausts, a piston correspondingly formed and telescopically arranged over said tubular wall and having an annular face surrounding said wall and forming within and without together with the cylinder parts low compression chambers connected with the explosion chambers through by-passes in the wall of said cylinder uncovered during the travel of said piston.

4. In an internal combustion engine, a cylinder having a portion thereof of reduced diameter and flanges extending laterally from said reduced portion forming shoulders, said cylinder having a tubular wall extending thereinto and exhausts at each end and an inlet intermediate of its length and adjacent to said shoulder, a hollow piston forming a low compression chamber and extending into said reduced portion and telescopically arranged over said tubular wall and having an outlet and an annular flange forming a face surrounding said tubular wall and partitioning the annular explosion chamber from an annular low compression chamber, a cap terminating in a suitable gland and a piston rod secured to said piston and extending through said gland.

5. In a device of the class described, in combination, a cylinder formed of two sections, the section of smaller diameter having outwardly extending flanges meeting the walls of the section of larger diameter and forming shoulders intermediate of the length of the complete cylinder, said cylinder having inlets, outlets, by-passes, an outer casing completely therearound forming a water jacket, an opening in the head of the larger section and a double wall extending inwardly and terminating intermediate of the length of the said larger section, a cap closing said opening in the head of the cylinder having an inlet port therethrough, and a gland formed in the crown thereof, a hollow piston adapted to operate in said section of smaller diameter and over said inwardly extending double wall and having an outlet port adjacent to its upper end and an outwardly extending flange at its lower end terminating in a T-head abutting the wall of the section of larger diameter, said piston forming in the interior thereof a low compression chamber and partitioning a second low compression chamber in said larger section, said low compression chambers being connected with the explosion chambers at the ends of said cylinder respectively by said by-passes, and a piston rod extending from said piston through said gland.

6. In a device of the class described, in combination, a cylinder having a reduced portion and a piston correspondingly formed and operating therein, said cylinder having an opening in one head thereof and a tubular wall extending inwardly from said opening forming an annular explosion chamber corresponding substantially in area to an explosion chamber at the other end of said cylinder and said piston forming with the chamber inclosed by said tubular wall a low compression chamber having a suitable inlet thereinto and with the wall of said cylinder a second low compression chamber having a suitable inlet thereinto, suitable passages being arranged from the low compression chambers to said explosion chambers and suitable exhaust ports from said explosion chambers, and check valves in said inlet ports.

7. In a device of the class described, in combination, a cylinder having an explosion chamber at each end thereof of substantially equal area one of said chambers surrounding an inner tubular wall from an opening in the cylinder head, said wall forming a fluid chamber having an inlet thereinto and a piston correspondingly formed and traveling over said tubular wall correspondingly formed and operating within said cylinder and forming in combination therewith a plurality of low compression chambers connected with a supply of explosive mixture and suitably connected with said explosion chambers on the operation of said piston one of said low compression chambers being within said piston and the other being without said piston said explosion chambers having suitable exhaust ports therefrom, and an ignition means at each end of the cylinder.

8. In a device of the class described, in combination, a cylinder having sections of different diameters and an explosion chamber in each section of substantially equal area one of said explosion chambers surrounding a tubular wall extending inwardly from one of the heads and a hollow piston correspondingly formed operating therein, said piston forming with the chamber inclosed by the said tubular wall and with the wall of said cylinder a plurality of low compression chambers having suitable inlet ports connected to a supply of explosive mixture, said low compression chambers being arranged through suitable by-passes in the cylinder to connect with said explosion chambers at definite periods during the operation of said piston, and an ignition means at each end of the cylinder.

9. In a device of the class described, in combination, a cylinder having a reduced end forming an explosion chamber having inlet and exhaust ports and an annular explosion chamber in the larger end formed by a tubular wall within the cylinder and having inlet and exhaust ports and a piston operating in said cylinder and adapted to travel on said tubular wall and form a plurality of low compression chambers having suitable inlet and outlet ports and connected at definite periods with the explosion chambers at the ends of said cylinder respectively, valves arranged in said inlet ports to the compression chamber, a valve in said exhaust port from the annular explosion chamber, a piston rod operatively connected with said exhaust port valve, and an ignition means at each end of the cylinder.

Signed at the city and district of Montreal, Quebec, Canada, this 26th day of January, 1910.

ANDREW BETTS BROWN.
WILLIAM ALBERT HICKMAN.

Witnesses:
 G. H. TRESIDDER,
 P. SHEE.

---

Copies of this patent may be obtained for five cents each, by addressing the "Commissioner of Patents, Washington, D. C."